United States Patent
Jang et al.

(10) Patent No.: US 10,354,165 B2
(45) Date of Patent: *Jul. 16, 2019

(54) APPARATUS FOR DETECTING AFTERIMAGE CANDIDATE REGION AND APPARATUS INCLUDING THE SAME FOR PREVENTING AFTERIMAGE

(71) Applicant: Samsung Display Co. Ltd., Yongin (KR)

(72) Inventors: Yong Jun Jang, Yongin-si (KR); Nam Gon Choi, Yongin-si (KR); Joon Chul Goh, Hwaseong-si (KR); Gi Geun Kim, Seoul (KR); Geun Jeong Park, Daegu (KR); Cheol Woo Park, Suwon-si (KR); Yun Ki Baek, Suwon-si (KR); Jeong Hun So, Hwaseong-si (KR); Dong Gyu Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 203 days.

This patent is subject to a terminal disclaimer.

(21) Appl. No.: 15/377,411

(22) Filed: Dec. 13, 2016

(65) Prior Publication Data
US 2017/0091583 A1    Mar. 30, 2017

Related U.S. Application Data

(62) Division of application No. 14/204,564, filed on Mar. 11, 2014, now Pat. No. 9,552,534.

(30) Foreign Application Priority Data

Sep. 9, 2013 (KR) .......................... 10-2013-0107994

(51) Int. Cl.
*G06K 9/00* (2006.01)
*G06K 9/62* (2006.01)
(Continued)

(52) U.S. Cl.
CPC ......... *G06K 9/6212* (2013.01); *G06K 9/4604* (2013.01); *G06T 5/008* (2013.01);
(Continued)

(58) Field of Classification Search
CPC ...... G06K 9/6212; G06K 9/4604; G09G 5/10; G09G 2320/0257; G06T 5/50; G06T 5/008; G06T 2207/10016; G06T 2207/20216
See application file for complete search history.

(56) References Cited

U.S. PATENT DOCUMENTS

| | | | | |
|---|---|---|---|---|
| 5,296,847 A | * | 3/1994 | Takeda | G09G 3/3648 345/208 |
| 8,830,260 B2 | * | 9/2014 | Ogasawara | G01D 7/00 345/619 |
| 9,552,534 B2 | * | 1/2017 | Jang | G06K 9/6212 |
| 2004/0189568 A1 | | 9/2004 | Lee et al. | |
| 2008/0136845 A1 | * | 6/2008 | Nakanishi | G09G 3/2025 345/690 |

(Continued)

FOREIGN PATENT DOCUMENTS

KR    1020100005098    1/2010
KR    1020110095008    8/2011
(Continued)

*Primary Examiner* — Aaron W Carter
(74) *Attorney, Agent, or Firm* — Cantor Colburn LLP

(57) ABSTRACT

An apparatus for detecting an afterimage candidate region includes: a comparison unit which compares gradation data of an n-th frame with integrated gradation data of an (n−1)-th frame and generates integrated gradation data of the n-th frame, where n is a natural number; a memory which provides the integrated gradation data of the (n−1)-th frame (Continued)

to the comparison unit and stores the integrated gradation data of the n-th frame; and an afterimage candidate region detection unit which detects an afterimage candidate region based on the integrated gradation data of the n-th frame, where each of the integrated gradation data of the n-th frame and the integrated gradation data of the (n−1)-th frame comprises a comparison region and a gradation region.

10 Claims, 8 Drawing Sheets

(51) Int. Cl.
*G06T 5/00* (2006.01)
*G06T 5/50* (2006.01)
*G06K 9/46* (2006.01)
*G09G 5/10* (2006.01)

(52) U.S. Cl.
CPC ............... *G06T 5/50* (2013.01); *G09G 5/10* (2013.01); *G06T 2207/10016* (2013.01); *G06T 2207/20216* (2013.01); *G09G 2320/0257* (2013.01)

(56) References Cited

U.S. PATENT DOCUMENTS

| | | | |
|---|---|---|---|
| 2009/0040156 A1* | 2/2009 | Jun | G09G 3/2011 345/87 |
| 2009/0121990 A1* | 5/2009 | Shigeta | G09G 3/3648 345/87 |
| 2011/0235943 A1 | 9/2011 | Ogasawara et al. | |
| 2013/0064424 A1 | 3/2013 | Adachi et al. | |
| 2015/0071550 A1* | 3/2015 | Jang | G06K 9/6212 382/199 |
| 2017/0091583 A1* | 3/2017 | Jang | G06K 9/6212 |
| 2017/0295300 A1* | 10/2017 | Esashi | H04N 1/405 |
| 2018/0075796 A1* | 3/2018 | Hayashi | G09G 3/3648 |

FOREIGN PATENT DOCUMENTS

| | | | | |
|---|---|---|---|---|
| KR | 1020120014515 | 2/2012 | | |
| WO | 2007011086 | 1/2007 | | |
| WO | WO-2007011086 A1 * | 1/2007 | ........... | G09G 3/3611 |

* cited by examiner

EEIM

APPARATUS FOR DETECTING AFTERIMAGE CANDIDATE REGION AND APPARATUS INCLUDING THE SAME FOR PREVENTING AFTERIMAGE

This application is a divisional of U.S. patent application Ser. No. 14/204,564, filed on Mar. 11, 2014, which claims priority to Korean Patent Application No. 10-2013-0107994, filed on Sep. 9, 2013, and all the benefits accruing therefrom under 35 U.S.C. § 119, the content of which in its entirety is herein incorporated by reference.

BACKGROUND

1. Field

Exemplary embodiments of the invention relate to an apparatus for detecting an afterimage candidate region and an apparatus including the apparatus for detecting the afterimage candidate region for preventing an afterimage.

2. Description of the Prior Art

In a display device that continuously displays an image including a region having a fixed image, an afterimage may occur on the display device. When such an afterimage occurs, traces may remain on the region, where the fixed image had been displayed to cause the displayed image to get stained even if the fixed image is not displayed anymore on the display device. In such a display device that continuously displays the image including the fixed image, the display quality may deteriorate due to the occurrence of the afterimage. In such a display device, a candidate region where an afterimage may occur, that is, an afterimage candidate region, may be detected to apply an algorithm for preventing deterioration of the display quality.

SUMMARY

In a display device that continuously displays the image including the fixed image, a region that includes a fixed image through comparison of frames included in an image may be determined as an afterimage candidate region. In such a display device, a memory for storing at least data of a previous frame and another memory for storing information about similarity or identicalness between the previous frame and a current frame are typically used to find the region that includes the fixed image.

In exemplary embodiments, an apparatus for detecting an afterimage candidate region and an apparatus including the apparatus for detecting an afterimage candidate region effectively prevent an afterimage, with reduced number or size of memories included therein or with improved driving speed.

In an exemplary embodiment, an apparatus for detecting an afterimage candidate region includes: a comparison unit which compares gradation data of an n-th frame with integrated gradation data of an (n−1)-th frame and generates integrated gradation data of the n-th frame, where n is a natural number; a memory which provides the integrated gradation data of the (n−1)-th frame to the comparison unit and stores the integrated gradation data of the n-th frame; and an afterimage candidate region detection unit which detects an afterimage candidate region based on the integrated gradation data of the n-th frame, where each of the integrated gradation data of the n-th frame and the integrated gradation data of the (n−1)-th frame comprises a comparison region and a gradation region.

In another exemplary embodiment, an apparatus for detecting an afterimage candidate region includes an edge enhancement unit which generates edge enhanced gradation data of an n-th frame from gradation data of the n-th frame, where n is a natural number; a comparison unit which compares edge enhanced gradation data of the n-th frame with integrated gradation data of an (n−1)-th frame and generates integrated gradation data of the n-th frame; a memory which provides the integrated gradation data of the (n−1)-th frame to the comparison unit and stores the integrated gradation data of the n-th frame; and an afterimage candidate region detection unit which detects an afterimage candidate region based on the integrated gradation data of the n-th frame, where each of the integrated gradation data of the n-th frame and the integrated gradation data of the (n−1)-th frame includes a comparison region and a gradation region.

In another exemplary embodiment, an apparatus for preventing an afterimage includes: an afterimage candidate region detection unit which receives image data including gradation data of an n-th frame and detects an afterimage candidate region, where n is a natural number; and a correction unit which corrects the gradation data of the n-th frame corresponding to the afterimage candidate region, where the afterimage candidate region detection unit includes: a comparison unit which compares the gradation data of the n-th frame with integrated gradation data of an (n−1)-th frame and generates integrated gradation data of the n-th frame; a memory which provides the integrated gradation data of the (n−1)-th frame to the comparison unit and stores the integrated gradation data of the n-th frame; and an afterimage candidate region detection unit which detects the afterimage candidate region based on the integrated gradation data of the n-th frame, where each of the integrated gradation data of the n-th frame and the integrated gradation data of the (n−1)-th frame includes a comparison region and a gradation region.

According to exemplary embodiments of the invention, as described above, the number or size of memories in the apparatus for detecting an afterimage candidate region and the apparatus for preventing an afterimage may be reduced.

In such embodiments, the driving speed of the apparatus for detecting an afterimage candidate region and the apparatus for preventing an afterimage that includes the apparatus for detecting an afterimage candidate region may be improved.

BRIEF DESCRIPTION OF THE DRAWINGS

The above and other features of the invention will be more apparent from the following detailed description taken in conjunction with the accompanying drawings, in which.

DETAILED DESCRIPTION

Figure 1:
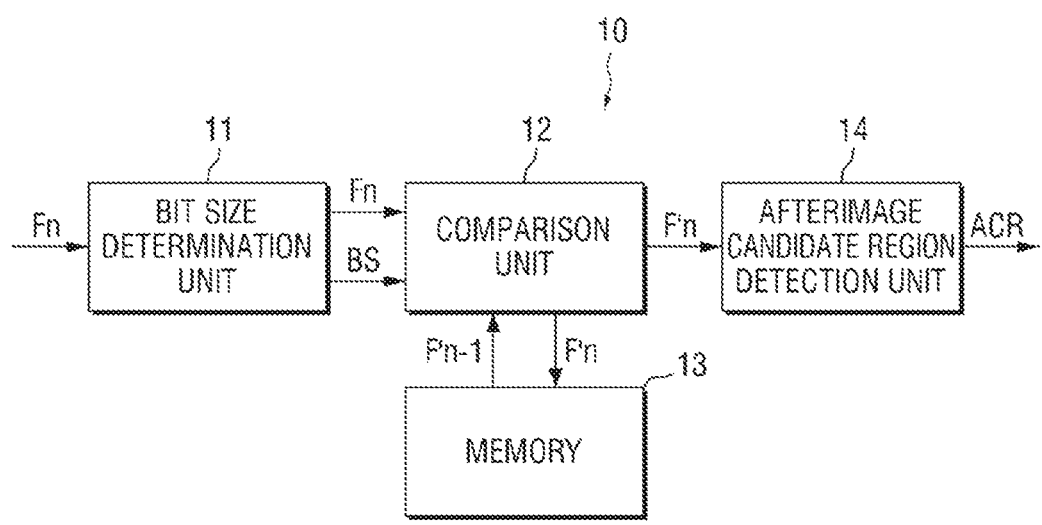
FIG. 1 is a block diagram of an exemplary embodiment of an apparatus for detecting an afterimage candidate region, according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described in detail with reference to the accompanying drawings.

FIG. 1 is a block diagram showing an exemplary embodiment of an apparatus for detecting an afterimage candidate region, according to the invention. Referring to FIG. 1, an exemplary embodiment of an apparatus 10 for detecting an afterimage candidate region includes a comparison unit or comparator 12, a memory 13 and an afterimage candidate region detection unit or afterimage candidate region detector 14.

The comparison unit 12 may compare gradation data Fn of an n-th frame with integrated gradation data F'n−1 of an (n−1)-th frame, and may generate integrated gradation data F'n of the n-th frame. A same image may be displayed during the (n−1)-th frame and the n-th frame. In such an embodiment, the (n−1)-th frame is a previous frame of the n-th frame, that is, a current frame. In such an embodiment, the (n−1)-th frame may not be an immediately previous to the n-th frame, and several frames may be between the (n−1)-th frame and the n-th frame. The gradation data Fn of the n-th frame may be data of gradations of all pixels in the n-th frame. The integrated gradation data F'n of the n-th frame may be generated from the integrated gradation data F'n−1 of the (n−1)-th frame and the gradation data Fn of the n-th frame. Here, n is a natural number.

Figure 2:
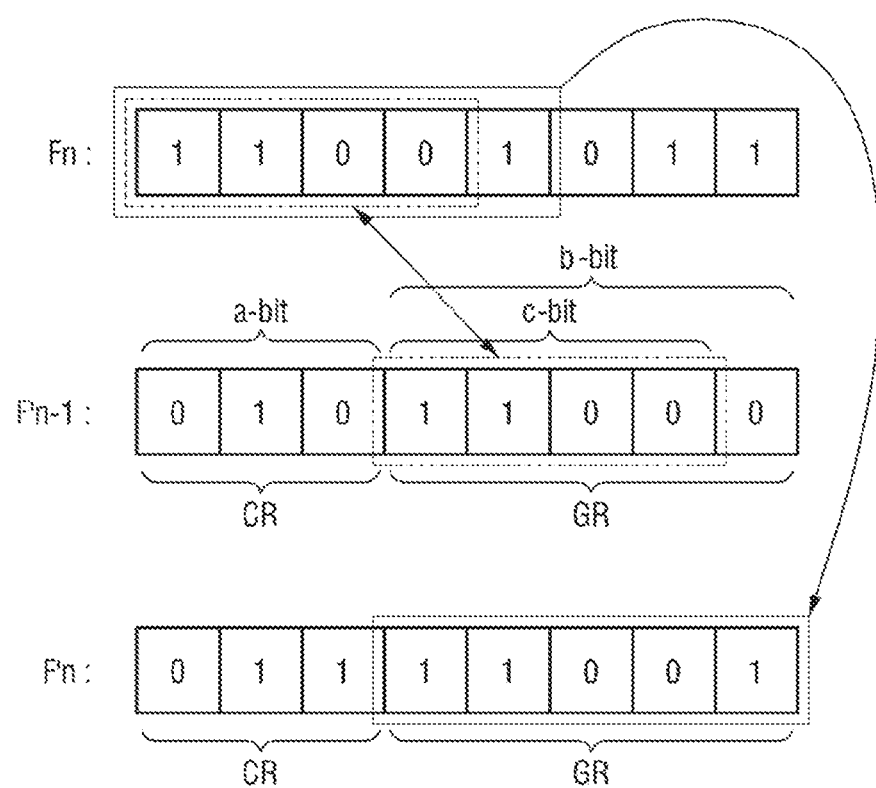
FIGS. 2 and 3 are diagrams showing exemplary embodiments of gradation data of the n-th frame, integrated gradation data of the (n−1)-th frame and integrated gradation data of the n-th frame.
Figure 3:
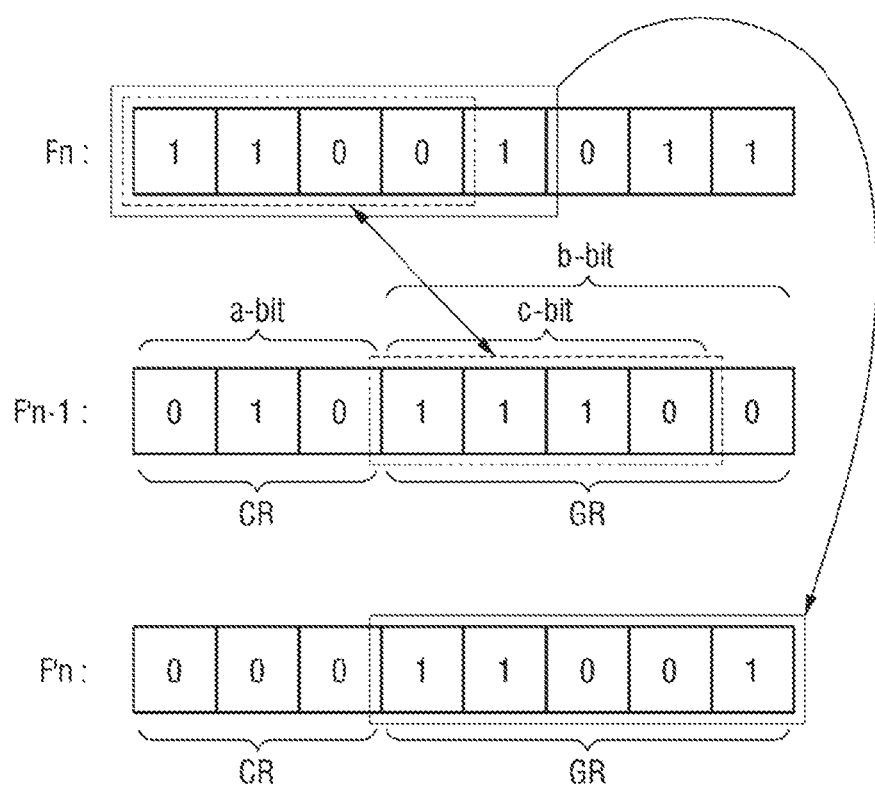

Hereinafter, referring to FIGS. 2 and 3, the gradation data Fn of the n-th frame, the integrated gradation data F'n−1 of the (n−1)-th frame, and the integrated gradation data F'n of the n-th frame will be described in greater detail. FIGS. 2 and 3 are diagrams showing exemplary embodiments of the gradation data of the n-th frame, the integrated gradation data of the (n−1)-th frame and the integrated gradation data of the n-th frame.

Referring to FIGS. 2 and 3, the gradation data Fn of the n-th frame, the integrated gradation data F'n−1 of the (n−1)-th frame and the integrated gradation data F'n of the n-th frame may have the same number of bits. In an exemplary embodiment, as shown in FIGS. 2 and 3, each of the gradation data Fn of the n-th frame, the integrated gradation data F'n−1 of the (n−1)-th frame and the integrated gradation data F'n of the n-th frame may has 8 bits, but not being limited thereto. In an alternative exemplary embodiment, the number of bits of the gradate data and the number of bits of the integrated gradation data may be varied. The number of bits of the gradation data and the number of bits of the integrated gradation data may be constant independently of the frames, and thus the number of bits of the gradation data and the number of bits of the integrated gradation data may be equal to each other.

The integrated gradation data F'n−1 and F'n may include a comparison region CR and a gradation region GR. The comparison region CR may have the size of a-bits, and the gradation region GR may have the size of b-bits. Here, a and b may be natural numbers less than 8. In one exemplary embodiment, as shown in FIGS. 2 and 3, a-bits may be three bits, and b-bits may be five bits, but not being limited thereto. In an alternative exemplary embodiment, the sizes of a-bits and b-bits may be variously set. Data that corresponds to the result of the comparison of the gradation of the current frame with the gradation of the previous frame may be stored in the comparison region CR. In one exemplary embodiment, for example, a value that is obtained from the result of the comparison of the gradation data Fn of the n-th frame with data of the gradation region GR included in the integrated gradation data F'n−1 of the (n−1)-th frame may be stored in the integrated gradation data F'n of the n-th frame. A value that corresponds to upper b-bits of the gradation data of the current frame may be stored in the gradation region GR. In one exemplary embodiment, for example, a value that corresponds to upper 5-bits (b-bits) of the gradation data Fn of the n-th frame may be stored in the gradation region GR that is included in the integrated gradation data F'n of the n-th frame.

Hereinafter, an exemplary embodiment of a method for determining data of the comparison region CR will be described in greater detail. In an exemplary embodiment, the gradation data F'n of the n-th frame may be compared with the data of the gradation region GR in the integrated gradation data F'n−1 of the (n−1)-th frame to determine a data value of the comparison region CR in the integrated gradation data F'n of the n-th frame. In an exemplary embodiment, the comparison unit 12 may determine the similarity or identicalness through comparison of the upper c-bits of the gradation data Fn of the n-th frame with the upper c-bits of the data of the gradation region GR in the integrated gradation data F'n−1 of the (n−1)-th frame to determine whether a same gradation is maintained with respect to pixels corresponding to data that are targeted for comparison in the (n−1)-th frame and the n-th frame. In such an embodiment, if the upper c-bits of the gradation data Fn of the n-th frame is equal to the upper c-bits of the data of the gradation region GR in the integrated gradation data F'n−1 of the (n−1)-th frame, the comparison unit 12 may determine the same gradation is maintained with respect to pixels corresponding to data that are targeted for comparison in the (n−1)-th frame and the n-th frame. In such an embodiment, by comparing the upper b-bits of the gradation data rather than comparing lower bits of the gradation data, whether the same gradation is maintained in the pixels corresponding to data that are targeted for comparison or not is substantially determined, and through such a method, the apparatus 10 for detecting an afterimage candidate region improves the operating speed in comparison to a conventional method, in which the whole gradation data between the respective frames are compared. In an exemplary embodiment, c may be an integer that is equal to or less than b. In an exemplary embodiment, as shown in FIGS. 2 and 3, c-bits may be four bits, but not being limited thereto, and the size of the c-bits may be variously set in an alternative exemplary embodiment.

The comparison unit 12 may sequentially compare the upper c-bits of the gradation data Fn of the n-th frame with the upper c-bits of the data of the gradation region GR in the integrated gradation data F'n−1 of the (n−1)-th frame on a bit-by-bit basis. In an exemplary embodiment, the comparison unit 12 may sequentially compare the upper c-bits of the gradation data Fn of the n-th frame with the upper c-bits of the data of the gradation region GR in the integrated gradation data F'n−1 of the (n−1)-th frame bit by bit, and if any non-similarity or non-identicalness, e.g., non-identical bit value, that is a value of the bit (e.g., 0 or 1), is recognized as the result of the comparison, the comparison unit 12 may stop the comparison. Referring to FIG. 3, the comparison unit 12 may sequentially compare the upper c-bits of the gradation data Fn of the n-th frame with the upper c-bits of the data of the gradation region GR in the integrated gradation data F'n−1 of the (n−1)-th frame, and if the non-similarity or non-identicalness is recognized at the third bits, the comparison unit 12 may not compare the fourth bits of the upper c-bits. Through such a method, it is determined whether the upper c-bits of the gradation data Fn of the n-th frame is the same as the upper c-bits of the data of the gradation region GR in the integrated gradation data F'n−1 of the (n−1)-th frame, and if the upper c-bits of the gradation data Fn of the n-th frame and the upper c-bits of the data of the gradation region GR in the integrated gradation data F'n−1 of the (n−1)-th frame are not the same as each other, the comparison unit 12 stops performing the comparison without checking the bit data in all of the upper c-bits, and thus the driving speed of the apparatus 10 for detecting the afterimage candidate region is substantially improved. As illustrated in FIG. 2, if all the upper c-bits of the gradation data Fn of the n-th frame are the same as the upper c-bits of the data of the gradation region GR in the integrated gradation data F'n−1 of the (n−1)-th frame, the comparison unit 12 may determine that the same gradation is maintained with respect to pixels corresponding to data that are targeted for comparison in the (n−1)-th frame and the n-th frame.

As shown in FIG. 2, if all the upper c-bits of the gradation data Fn of the n-th frame are the same as the upper c-bits of the data of the gradation region GR that is included in the integrated gradation data F'n−1 of the (n−1)-th frame, the comparison unit 12 may set the data value of the comparison region CR in the integrated gradation data F'n of the n-th frame as a value increased from the data value of the comparison region CR in the integrated gradation data F'n−1 of the (n−1)-th frame. In an exemplary embodiment, as shown in FIG. 2, the data value of the comparison region CR that is included in the integrated gradation data F'n is increased by 1, for example, from the data value of the comparison region CR that is included in the integrated gradation data F'n−1 of the (n−1)-th frame, but is not limited thereto.

As shown in FIG. 3, if the upper c-bits of the gradation data Fn of the n-th frame are not the same as the upper c-bits of the data of the gradation region GR that is included in the integrated gradation data F'n−1 of the (n−1)-th frame, the comparison unit 12 may reset the data value of the comparison region CR that is included in the integrated gradation data F'n of the n-th frame. In an exemplary embodiment, as shown in FIG. 3, the reset data value of the comparison region CR may be zero (0), for example, but is not limited thereto.

In an exemplary embodiment, as described above, if it is determined that the gradations of the corresponding pixels are equally maintained in the previous frame and in the current frame, the data value of the comparison region CR may be increased. In such an embodiment, if it is determined that the gradations of the pixels are not equally maintained in the previous frame and in the current frame, the data value of the comparison region CR may be reset. Accordingly, the data value of the comparison region CR may correspond to the number of frames in which the gradations of the corresponding pixels are equally maintained.

In an alternative exemplary embodiments, the comparison unit 13 may compare the upper c-bits of the gradation data Fn of the n-th frame with the upper c-bits of the data of the gradation region GR in the integrated gradation data F'n−1 of the (n−1)-th frame and determine bits of the gradation data Fn of the n-th frame and the data of the gradation region GR having a same value, the comparison unit 13 may calculate an identification value through addition of weight values corresponding to the bits having the same value. In one exemplary embodiment, for example, when comparing the upper 4-bits of the gradation data Fn of the n-th frame with the upper 4-bits of the data of the gradation region GR in the integrated gradation data F'n−1 of the (n−1)-th frame, the first, second and fourth bits in the upper 4-bits of the gradation data Fn of the n-th frame and the upper 4-bits of the data of the gradation region GR in the integrated gradation data F'n−1 of the (n−1)-th frame may be the same as each other, but values of the third bits therein may not be the same as each other, as shown in FIG. 3. In such an embodiment, the identification value of the upper 4-bits may be calculated by adding the weight values set with respect to the bits, the values of which in the upper 4-bits of the gradation data Fn of the n-th frame and the upper 4-bits of the data of the gradation region GR in the integrated gradation data F'n−1 of the (n−1)-th frame are the same as each other, e.g., the first, second and fourth bits. In such an embodiment, an upper bit may have a larger weight value. If the identification value is greater than a predetermined reference value, the comparison unit 12 may determine that the same gradation is maintained with respect to the pixels corresponding to the data that are targeted for comparison in the (n−1)-th frame and in the n-th frame, and may set the data value of the comparison region CR in the integrated gradation data F'n of the n-th frame as a value increased from the data value of the comparison region CR in the integrated gradation data F'n−1 of the previous frame. If the identification value is less than the predetermined reference value, the comparison unit 12 may determine that the same gradation is not maintained with respect to the pixels corresponding to the data that are targeted for comparison in the (n−1)-th frame and in the n-th frame, and may reset the data value of the comparison region CR in the integrated gradation data F'n of the n-th frame.

Referring back to FIG. 1, the memory 13 may provide the integrated gradation data F'n−1 of the (n−1)-th frame to the comparison unit 12, and may receive the integrated gradation data F'n of the n-th frame from the comparison unit 12 to store the integrated gradation data F'n of the n-th frame. The apparatus 10 for detecting the afterimage candidate region may store the integrated gradation data, in which the gradation region GR that has the data related to the gradations displayed on the respective pixels of the image and the comparison region CR that has the data related to whether the gradations are equally maintained with respect to the respective pixels of the image are integrated, in the memory 13. Accordingly, in such an embodiment, the data related to the gradations and the data related to the maintenance of the gradations are not separately stored in a memory, and thus the size or the number of memories for storing the data is substantially reduced.

The afterimage candidate region detection unit 14 may detect the afterimage candidate region ACR (shown in FIG. 4) from the integrated gradation data F'n of the n-th frame. The afterimage candidate region ACR means an image region in which the same image is maintained in a partial region of the image over a predetermined time period and an afterimage may occur on the display device. The afterimage candidate region detection unit 14 may determine a region of pixels where the data value of the comparison region CR of the integrated gradation data F'n of the n-th frame is equal to or greater than a predetermined reference value as the afterimage candidate region ACR.

Figure 4:
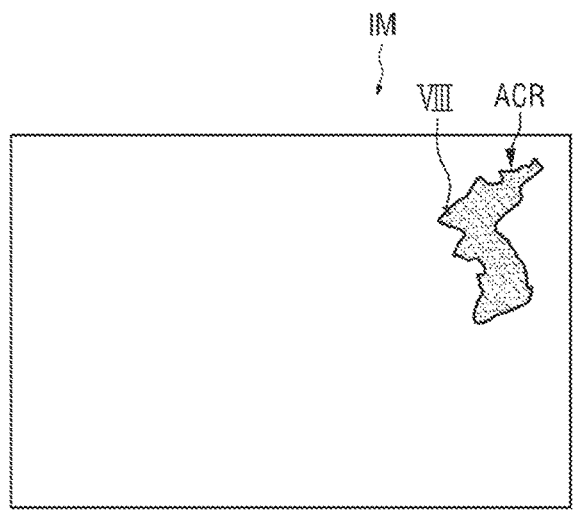
FIG. 4 is a diagram illustrating an image for an exemplary embodiment of an apparatus for detecting an afterimage candidate region, according to the invention.

Hereinafter, the afterimage candidate region ACR will be described in greater detail with reference to FIG. 4. FIG. 4 is a diagram illustrating an image for an exemplary embodiment of an apparatus for detecting an afterimage candidate region, according to the invention.

Referring to FIG. 4, the afterimage candidate region detection unit 14 may designate a partial region of an image IM as the afterimage candidate region ACR. The image of the afterimage candidate region ACR may not be changed or be equally maintained for the predetermined time period even if the frame of the image IM is changed. Although not illustrated, the image of other regions other than the afterimage candidate region ACR may be continuously varied.

Referring back to FIG. 1, the apparatus 10 for detecting the afterimage candidate region may further include a bit size determination unit or bit size determinator 11. The bit size determination unit 11 may detect luminance of the n-th frame from the gradation data Fn of the n-th frame, and may determine the size of the c-bits corresponding to the detected luminance. The bit size determination unit may decrease the size of the c-bits if the luminance of the n-th frame is increased, and may increase the size of the c-bits if the luminance of the n-th frame is decreased. As the luminance of the n-th frame is increased, the value of the gradation data Fn of the n-th frame may be also increased. Accordingly, in an exemplary embodiment, when the luminance of the n-th frame is substantially high, it may be determined whether the same gradation is maintained in the (n−1)-th frame and the n-th frame only through comparison of upper bits of the gradation data Fn of the n-th frame with upper bits of the gradation region BR of the integrated gradation data F'n−1 of the (n−1)-th frame. In such an embodiment, when the luminance of the n-th frame is increased, the bit size determination unit 11 decreases the size of c-bits, and thus the time required to confirm the similarity or identicalness between the gradation data Fn of the n-th frame and the gradation region GR of the integrated gradation data F'n−1 of the (n−1)-th frame may be shortened to improve the driving speed of the apparatus 10 for detecting the afterimage candidate region. When the luminance of the n-th frame is decreased, the value of the gradation data Fn of the n-th frame is also decreased, and thus there is a high possibility that the upper bit has a value of zero (0). In this case, for meaningful similarity or identicalness confirmation of the gradation in in the (n−1)-th frame and the n-th frame, comparison of a relatively low bit may be performed. Accordingly, in an exemplary embodiment, when the luminance of the n-th frame is decreased, the bit size determination unit 11 increases the size of c-bits and performs comparison with respect to a relatively low bit for the similarity or identicalness confirmation, such that the apparatus 10 for detecting the afterimage candidate region may detect an afterimage candidate region ACR with improved accuracy. The bit size determination unit 11 may provide the size of c-bits to the comparison unit 12 as bit size data BS.

Figure 5:
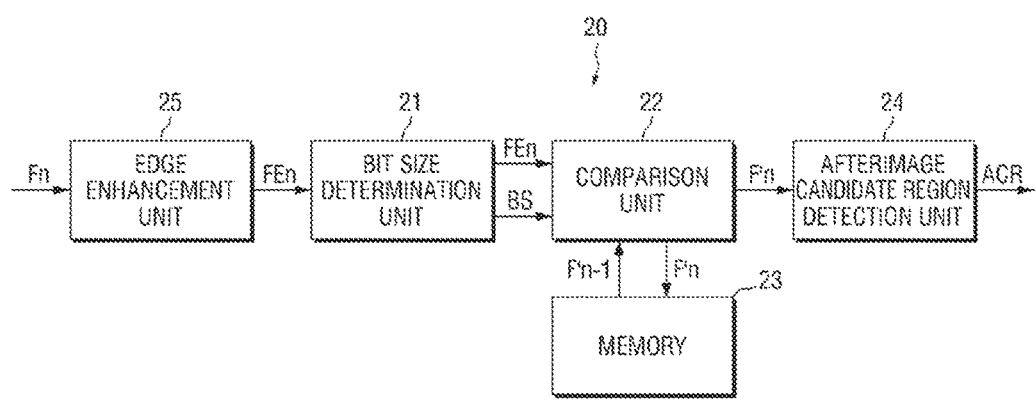
FIG. 5 is a block diagram illustrating an alternative exemplary embodiment of an apparatus for detecting an afterimage candidate region, according to the invention.

Hereinafter, referring to FIG. 5, an alternative exemplary embodiment of an apparatus for detecting an afterimage candidate region, according to the invention, will be described. FIG. 5 is a block diagram illustrating an alternative exemplary embodiment of an apparatus for detecting an afterimage candidate region, according to the invention.

Referring to FIG. 5, an alternative exemplary embodiment of an apparatus 20 for detecting an afterimage candidate region includes an edge enhancement unit 25, a comparison unit 22, a memory 23 and an afterimage candidate region detection unit 24.

Figure 6:
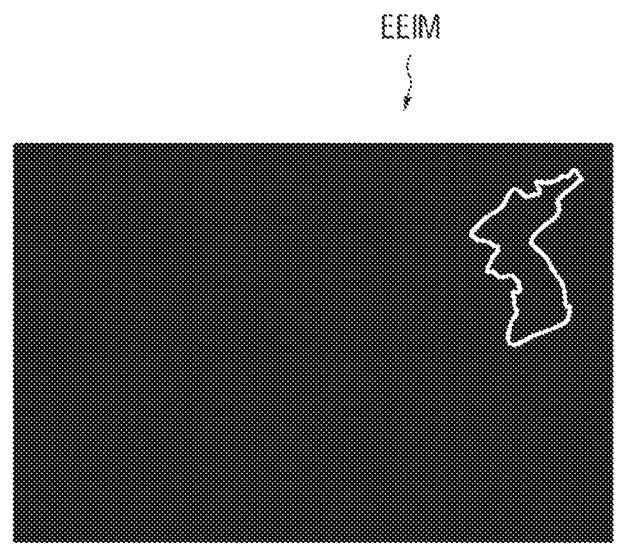
FIG. 6 is a diagram illustrating an edge enhanced image with respect to the image of FIG. 4.

The edge enhancement unit 25 may generate edge enhanced gradation data FEn of the n-th frame from the gradation data Fn of the n-th frame. The edge enhancement unit 25 may generate an edge enhanced image of the n-th frame, which is obtained by enhancing edges of shapes included in the image of the n-th frame, and the edge enhanced gradation data FEn of the n-th frame may be data related to gradations of respective pixels of the edge enhanced image of the n-th frame. The edge enhanced image of the n-th frame may be an image corresponding to a change amount of gradation in the image of the n-th frame, and may be obtained by differentiating the image of the n-th frame. FIG. 6 is a diagram illustrating an edge enhanced image EEIM with respect to the image IM of FIG. 4. As shown in FIGS. 4 and 6, in the edge enhanced image EEIM, the border of the shape corresponding to the afterimage candidate region ACR may be embossed, and thus the apparatus 20 for detecting the afterimage candidate region may detect the afterimage candidate region ACR more efficiently or effectively.

The comparison unit 22 may compare the edge enhanced gradation data FEn of the n-th frame with the integrated gradation data F'n−1 of the (n−1)-th frame, and may generate the integrated gradation data F'n of the n-th frame. In such an embodiment, the comparison unit 22 shown in FIG. 5 is substantially the same as the comparison unit 12 of FIG. 1 except that the edge enhanced gradation data Fen of the n-th frame is provided instead of the gradation data Fn of the n-th frame.

The memory 23 may provide the integrated gradation data F'n−1 of the (n−1)-th frame to the comparison unit 22, and may store the integrated gradation data F'n of the n-th frame that is received from the comparison unit 22.

The afterimage candidate region detection unit 24 may detect the afterimage candidate region ACR from the integrated gradation data F'n of the n-th frame. The afterimage candidate region detection unit 24 shown in FIG. 5 is substantially the same as the afterimage candidate region detection unit 14 of FIG. 1, and any repetitive detailed description thereof will be omitted.

The apparatus 20 for detecting the afterimage candidate region may further include a bit size determination unit 21.

The bit size determination unit 21 may detect luminance of the edge enhanced image of the n-th frame from the edge enhanced gradation data FEn of the n-th frame, and may determine the size of the c-bits corresponding to the detected luminance. In an exemplary embodiment, the size of c-bits may be substantially proportional to the detected luminance. In one exemplary embodiment, for example, the bit size determination unit 21 may decrease the size of the c-bits if the luminance of the edge enhanced image of the n-th frame is increased, and may increase the size of the c-bits if the luminance of the edge enhanced image of the n-th frame is decreased. If the luminance of the edge enhanced image of the n-th frame is increased, there is a high possibility that the value of the edge enhanced gradation data FEn of the n-th frame is also increased. Accordingly, in an exemplary embodiment, only through comparison of upper bits of the edge enhanced gradation data FEn of the n-th frame with upper bits of the gradation region BR of the integrated gradation data F'n−1 of the (n−1)-th frame, the similarity or identicalness may be substantially accurately determined. In such an embodiment, when the luminance of the edge enhanced image of the n-th frame is increased, the bit size determination unit 21 decreases the size of c-bits, and thus the time required to confirm the similarity or identicalness between the edge enhanced gradation data FEn of the n-th frame and the gradation region GR of the integrated gradation data F'n−1 of the (n−1)-th frame may be shortened to improve the driving speed of the apparatus 20 for detecting the afterimage candidate region. When the luminance of the edge enhanced image of the n-th frame is decreased, the value of the edge enhanced gradation data FEn of the n-th frame may be also decreased, and thus there is a high possibility that the upper bit has a value of zero (0). In an exemplary embodiment, to increase accuracy of similarity or identicalness confirmation, comparison with respect to a relatively low bit is performed. Accordingly, when the luminance of the edge enhanced image of the n-th frame is decreased, the bit size determination unit 21 increases the size of c-bits and performs comparison with respect to a relatively low bit for the similarity or identicalness confirmation, such that the apparatus 20 for detecting the afterimage candidate region may detect the afterimage candidate region ACR with improved accuracy. The bit size determination unit 21 may provide the size of c-bits to the comparison unit 22 as bit size data BS.

As described above, in an exemplary embodiment, the apparatus 20 for detecting the afterimage candidate region may further include the edge enhancement unit 25, and may detect the afterimage candidate region based on the edge enhanced gradation data Fen of the n-th frame that is generated from the edge enhancement unit 25. As compared with the gradation data Fn of the n-th frame, the edge enhanced gradation data Fen of the n-th frame may have the enhanced edge of the afterimage candidate region ACR, and the apparatus 20 for detecting the afterimage candidate region includes the edge enhancement unit 25 to detect the afterimage candidate region ACR with improved accuracy.

Figure 7:
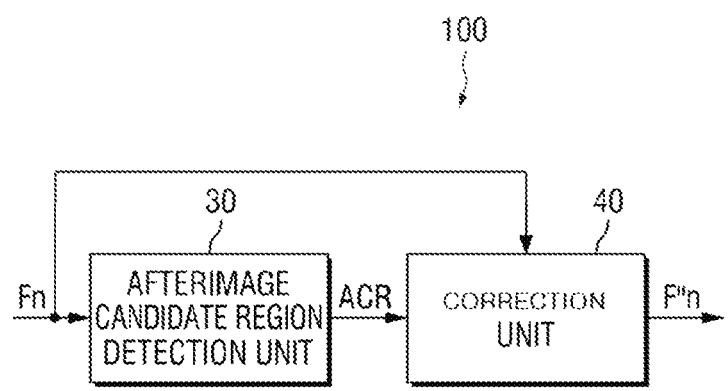
FIG. 7 is a diagram illustrating an exemplary embodiment of an apparatus for preventing an afterimage, according to the invention.

Hereinafter, referring to FIG. 7, an exemplary embodiment of an apparatus for preventing an afterimage, according to the invention, will be described. FIG. 7 is a diagram illustrating an exemplary embodiment of an apparatus for preventing an afterimage, according to the invention.

Referring to FIG. 7, the apparatus 100 for preventing an afterimage may include an afterimage candidate region detection unit 30, which is an apparatus for detecting an afterimage candidate region, and a correction unit 40.

The afterimage candidate region detection unit 30 may receive image data including the gradation data Fn of the n-th frame, and may detect the afterimage candidate region ACR. In such an embodiment, the afterimage candidate region detection unit 30 may be substantially the same as the exemplary embodiment of the apparatus 10 for detecting the afterimage candidate region shown in FIG. 1 or FIG. 5.

The correction unit 40 may correct the gradation data Fn of the n-th frame corresponding to the afterimage candidate region ACR. The correction unit 40 may reduce the occurrence of the afterimage through correction of the gradation data Fn of the n-th frame.

Figure 8:
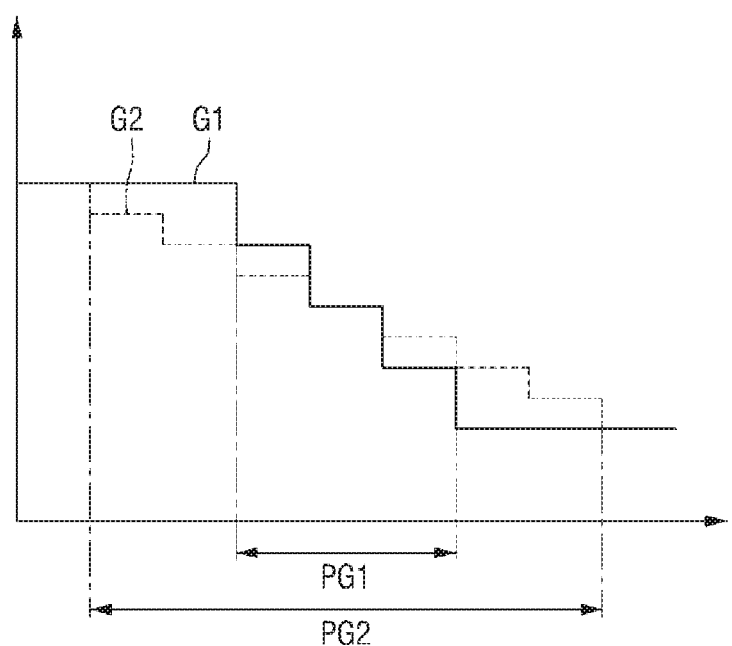
FIG. 8 is a graph illustrating a gradation of region VIII in FIG. 4.

Hereinafter, an exemplary embodiment of a correction method performed by the correction unit 40 will be described in detail with reference to FIG. 8. FIG. 8 is a graph illustrating a gradation of a region VIII in FIG. 4.

Referring to FIG. 8, G1 indicates the gradation of the region VIII before the correction unit 40 corrects the gradation data Fn of the n-th frame, and G2 indicates the gradation of the region VIII after the correction unit 40 corrects the gradation data Fn of the n-th frame. At an edge of the afterimage candidate region ACR, the gradation may be gradually varied in step forms, and regions of intermediate steps where the gradation is varied may be referred to as gradation regions PG1 and PG2. The correction unit 40 may generate corrected gradation data F'''n of the n-th frame through correction of the gradation data Fn of the n-th frame such that the width of the gradation region PG2 after the correction is increased and becomes greater than the width of the gradation region PG1 before the correction. In such an embodiment, the correction unit 40 may generate the corrected gradation data F'''n of the n-th frame through correction of the gradation data Fn of the n-th frame such that the gradation change of the edge of the afterimage candidate region ACR becomes slow. In general, when the afterimage occurs on the display device, an edge region of the afterimage may be more clearly recognized than other portions of the afterimage. Accordingly, in an exemplary embodiment, when the display device displays the image based on the corrected gradation data F'''n of the n-the frame, the change of the gradation at the edge portion becomes smooth, such that the edge region of the afterimage may not be substantially visually recognized by a viewer when the afterimage occurs.

Figure 9:
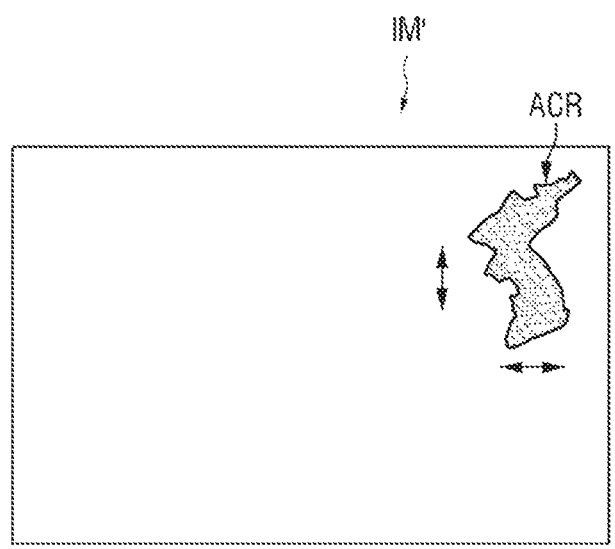
FIG. 9 is a diagram illustrating a corrected image by an alternative exemplary embodiment of an apparatus for preventing an afterimage, according to the invention.

Hereinafter, referring to FIG. 9, a corrected image by an alternative exemplary embodiment of the apparatus for preventing an afterimage, according to the invention, will be described. FIG. 9 is a diagram illustrating a corrected image by an alternative exemplary embodiment of the apparatus for preventing an afterimage, according to the invention.

Referring to FIG. 9, in an exemplary embodiment, the afterimage candidate region ACR included in the corrected image IM' may continuously perform translational motion leftward and rightward or upward and downward. In one exemplary embodiment, for example, the speed of the translational motion is about 8 pixels per minute. If the speed of the translational motion is too high, the afterimage candidate region ACR is substantially visually recognized as trembling, and thus the display quality of the display device may deteriorate. In an exemplary embodiment, the correction unit 40 may generate the corrected gradation data F'''n of the n-th frame through correction of the gradation data Fn of the n-th frame such that the afterimage candidate region ACR continuously performs the translational motion leftward and rightward or upward and downward. If the afterimage candidate region ACR continuously performs the translational motion leftward and rightward or upward and downward, the edge of the afterimage candidate region ACR is not fixed to the image, and the edge portion is thereby not substantially visually recognized by a viewer when the afterimage occurs on the display device. In another alternative exemplary embodiment of the invention, the correction unit 40 may generate the correction gradation data F'''n of the n-th frame through correction of the gradation data Fn of the n-th frame such that the afterimage candidate region ACR moves finely and continuously through rotation or diagonal translational motion of the afterimage candidate region ACR.

The invention should not be construed as being limited to the exemplary embodiments set forth herein. Rather, these exemplary embodiments are provided so that this disclosure will be thorough and complete and will fully convey the concept of the present invention to those skilled in the art.

While the invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. An apparatus for detecting an afterimage candidate region, comprising:
    an edge enhancer which generates edge enhanced gradation data of an n-th frame from gradation data of the n-th frame, wherein n is a natural number;
    a comparator which compares the edge enhanced gradation data of the n-th frame with integrated gradation data of an (n−1)-th frame and generates integrated gradation data of the n-th frame;
    a memory which provides the integrated gradation data of the (n−1)-th frame to the comparator and stores the integrated gradation data of the n-th frame; and
    an afterimage candidate region detector which detects the afterimage candidate region based on the integrated gradation data of the n-th frame,
    wherein each of the integrated gradation data of the n-th frame and the integrated gradation data of the (n−1)-th frame comprises a comparison region and a gradation region, the comparison region has a size of a-bits and the gradation region has a size of b-bits, wherein a and b are natural numbers less than the number of bits of the integrated gradation data of the n-th frame and the number of bits of the integrated gradation data of the (n−1)-th frame.

2. The apparatus for detecting an afterimage candidate region of claim 1, wherein
    the edge enhanced gradation data of the n-th frame corresponds to a change amount of gradation of the gradation data of the n-th frame.

3. The apparatus for detecting an afterimage candidate region of claim 1, wherein
    the number of bits of the gradation data of the n-th frame, the number of bits of the edge enhanced gradation data of the n-th frame, and the number of bits of the integrated gradation data of the n-th frame are equal to each other.

4. The apparatus for detecting an afterimage candidate region of claim 1, wherein
    a value of the gradation region of the integrated gradation data of the n-th frame is equal to a value of upper b-bits of the gradation data of the n-th frame.

5. The apparatus for detecting an afterimage candidate region of claim 1, wherein the comparator sequentially compares upper c-bits of the gradation region of the integrated gradation data of the (n−1)-th frame with upper c-bits of the edge enhanced gradation data of the n-th frame bit by bit, wherein c is a natural number, when values of corresponding bits of the upper c-bits of the gradation region of the integrated gradation data of the (n−1)-th frame and the upper c-bits of the edge enhanced gradation data of the n-th frame are the same as each other, the comparator sets a value of the comparison region of the integrated gradation data of the n-th frame as a value increased from a value of the comparison region of the integrated gradation data of the (n−1)-th frame, when the values of the corresponding bits of the upper c-bits of the gradation region of the integrated gradation data of the (n−1)-th frame and the upper c-bits of the edge enhanced gradation data of the n-th frame are different from each other, the comparator stops the comparison and resets the value of the comparison region of the integrated gradation data of the n-th frame.

6. The apparatus for detecting an afterimage candidate region of claim 1, wherein the comparator compares upper c-bits of the gradation region of the integrated gradation data of the (n−1)-th frame with upper c-bits of the edge enhanced gradation data of the n-th frame to detect corresponding bits of the gradation region of the integrated gradation data of the (n−1)-th frame and the gradation data of the n-th frame having a same value, wherein c is a natural number, a plurality of weight values, which is different from each other, is defined to correspond to the upper c-bits, when the identification value is greater than a reference value, the comparator sets the value of the comparison region of the integrated gradation data of the n-th frame as a value increased from the value of the comparison region of the integrated gradation data of the (n−1)-th frame, and when the identification value is less than a reference value, the comparator resets the value of the comparison region of the integrated gradation data of the n-th frame.

7. An apparatus for preventing an afterimage, comprising:

an afterimage candidate region detector which receives image data comprising gradation data of an n-th frame and detects an afterimage candidate region, wherein n is a natural number; and a corrector which corrects the gradation data of the n-th frame corresponding to the afterimage candidate region, wherein the afterimage candidate region detector comprises:

a comparator which compares the gradation data of the n-th frame with integrated gradation data of an (n−1)-th frame and generates integrated gradation data of the n-th frame;

a memory which provides the integrated gradation data of the (n−1)-th frame to the comparator and stores the integrated gradation data of the n-th frame; and an afterimage candidate region detector which detects the afterimage candidate region based on the integrated gradation data of the n-th frame, wherein each of the integrated gradation data of the n-th frame and the integrated gradation data of the (n−1)-th frame comprises a comparison region and a gradation region, the comparison region has a size of a-bits and the gradation region has a size of b-bits, wherein a and b are natural numbers less than the number of bits of the integrated gradation data of the n-th frame and the number of bits of the integrated gradation data of the (n−1)-th frame.

8. The apparatus for preventing an afterimage of claim 7, wherein the corrector corrects the gradation data of the n-th frame such that a speed of a gradation change of an edge of the afterimage candidate region is reduced.

9. The apparatus for preventing an afterimage of claim 7, wherein the corrector corrects the gradation data of the n-th frame such that the width of a gradation region arranged at an edge of the afterimage candidate region is increased.

10. The apparatus for preventing an afterimage of claim 7, wherein the corrector corrects the gradation data of the n-th frame such that the afterimage candidate region continuously performs translational motion leftward and rightward or upward and downward.

* * * * *